Nov. 10, 1959   E. R. BOYNTON   2,911,709
METHOD OF ASSEMBLING COMPRESSOR AND MOTOR
Filed May 6, 1957   2 Sheets-Sheet 1

INVENTOR.
ERWIN R. BOYNTON
BY
HIS ATTORNEY

Nov. 10, 1959   E. R. BOYNTON   2,911,709
METHOD OF ASSEMBLING COMPRESSOR AND MOTOR
Filed May 6, 1957   2 Sheets-Sheet 2

INVENTOR.
ERWIN R. BOYNTON
BY
HIS ATTORNEY

United States Patent Office 2,911,709
Patented Nov. 10, 1959

2,911,709

METHOD OF ASSEMBLING COMPRESSOR AND MOTOR

Erwin R. Boynton, Louisville, Ky., assignor to General Electric Company, a corporation of New York Application May 6, 1957, Serial No. 657,297

3 Claims. (Cl. 29—155.5)

The present invention relates to a method of assembling a compressor and its drive motor and more particularly to the assembling of a motor and the compressor main frame within the outer hermetic casing.

One of the problems encountered in the manufacture of hermetic compressors is that of obtaining satisfactory concentricity of air gap between the stator and rotor of the hermetic motor and maintaining this concentricity of air gap during and subsequent to the assembly of the motor with the main frame of the compressor. Many means of accomplishing this are employed. One of these is to use a main frame which contains the bearings for supporting the compressor shaft and the motor rotor and which frame is large enough so that the stator of the hermetic motor fits inside the frame. The air gap concentricity between the stator and the rotor is obtained by maintaining extremely close tolerances with respect to concentricity between the bearing surface and the inside surface of the frame and between the stator inner annular surface and its outside diameter. This method is costly and requires a large frame casting and an even larger hermetic casing which must go over the frame.

Another method of accomplishing this includes the step of holding all the parts in coaxial alignment by use of suitable gauge means while connecting the main frame and the stator together by welding or with bolts passing through accurately located bolt holes. In welding the stator and main frame together, the heat produced sometimes causes the stator to take on stresses which must be eliminated by a subsequent annealing operation, and this annealing operation frequently causes the parts to get out of alignment. When bolts are tightened, in order to fasten the main frame and stator together, there are unbalanced compressive forces set up which tend to cause the parts to yield unequally in certain areas and which, in turn, makes it very difficult to obtain satisfactory concentricity of air gap in the motor. The present invention eliminates the above difficulties while simplifying the overall method of assembly.

Accordingly, it is an object of the present invention to provide an improved method of assembling a compressor motor and compressor main frame thereby to obtain and maintain satisfactory concentricity of air gap between the stator and rotor of the motor without directly connecting the stator of the motor to the main frame of the compressor prior to the assembly of the parts into the casing.

Another object of the present invention is to provide a method for assembling a compressor motor and main frame in which the outer hermetic casing provides the sole means for supporting the motor and the frame therein after assembly and for holding these parts in coaxial alignment to maintain the satisfactory air gap concentricity between the motor components.

More specifically, an object of the present invention is to provide a method of assembling the drive motor and main frame of a compressor and maintaining satisfactory alignment therebetween while shrinking the outer hermetic casing of the unit around the outside diameters of the stator and the main frame.

Further objects and advantages of the invention will become apparent as the following description proceeds, and the features of novelty which characterize the invention will be pointed out with particularity in the claims annexed to and forming part of this specification.

In carrying out the objects of the present invention there is provided a stator having an accurately dimensioned inner surface and a frame having a journal bearing with a drive shaft extending therethrough. The shaft is inserted within the annular inner surface of the stator while the external surface of the frame is positioned in approximately coaxial relation to the external surface of the stator. The stator inner annular surface is arranged and held firmly in coaxial relation with the shaft surface by a gauge means placed in the space between the stator and the shaft while the casing is shrunk over the entire assembly, thereby uniting the outside surfaces of the stator and the frame with the inner surface of the casing. The gauge means is removed after the outer casing is shrunk onto the assembly and the casing holds and maintains the stator and frame in proper alignment.

For a better understanding of the invention reference may be had to the accompanying drawing in which.

Figure 1:
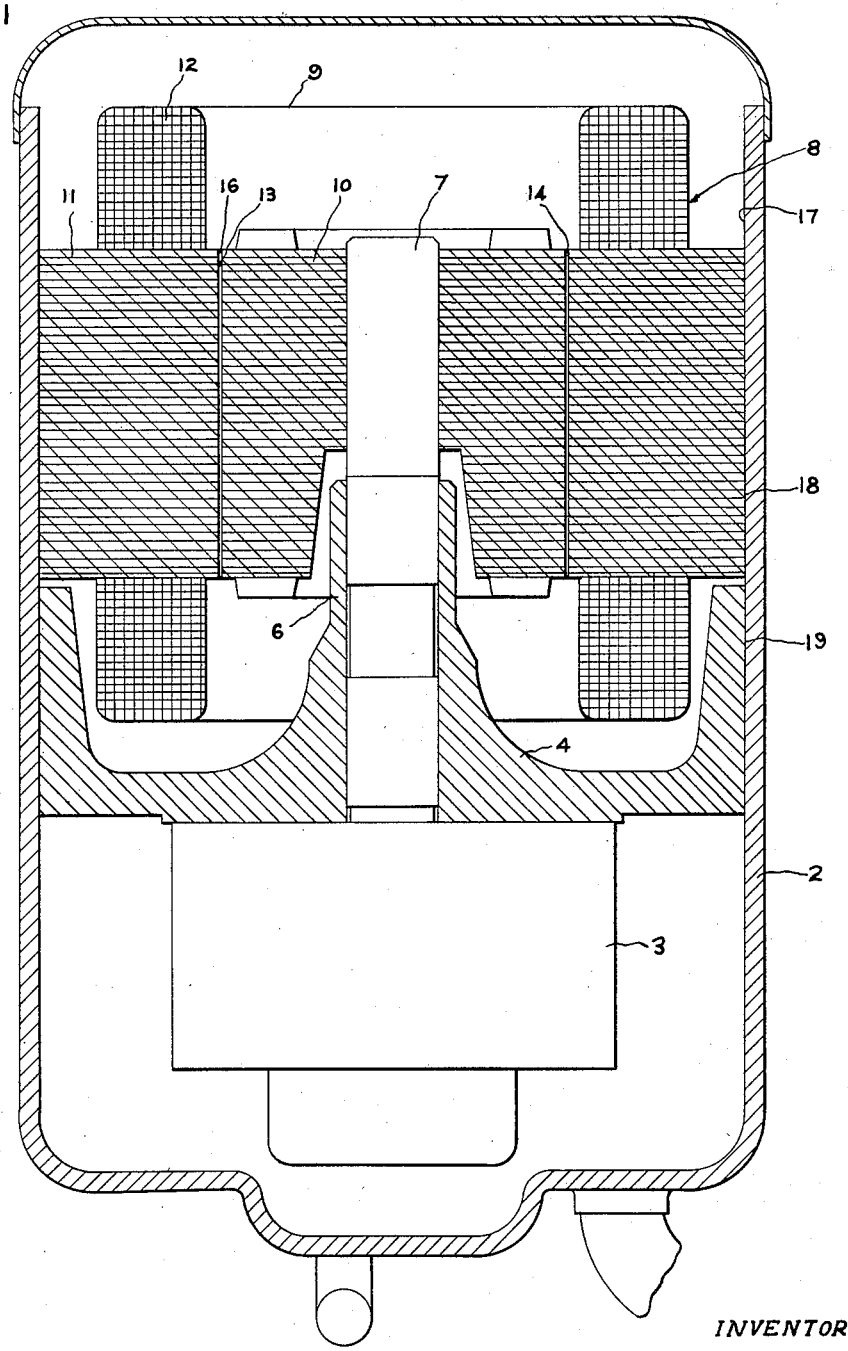
Fig. 1 is a side elevation view, in section, of a hermetic refrigerant compressor which may be assembled by the method of the present invention.

Referring to the drawings, there is shown in Fig. 1 a hermetic compressor having a hermetic casing 2 in which is disposed a refrigerant compressor unit 3. The compressor 3 is rigidly mounted upon a main frame member 4 which supports the compressor within the hermetic casing 2. The main frame 4 also contains a journal bearing 6 which supports the drive shaft 7 of the compressor in the vertical position within the casing. Mounted directly above the main frame 4 for driving the shaft 7 and the compressor 3 within the hermetic casing 2 is the motor 8 which includes a stator 9 and a rotor 10. The stator 9 consists of a laminated iron core 11 and the usual field coils 12 wound thereon. The inner surface of the stator core 11 is finished to cylindrical form of predetermined diameter, while the rotor, which also comprises a laminated metallic construction, has a somewhat smaller diameter than the interior diameter of the stator core 11 thereby providing rotational clearance in the form of a narrow air gap 13 between the rotor external surface 14 and the inner annular surface 16 of the stator core. The rotor 10 is normally pressed or shrunk onto the shaft 7 although it could be mounted by any of the methods well known in the art.

As may be seen in Fig. 1, both the main frame 4 and the stator core 11 are supported within the casing 2 by virtue of the compression force exerted by the inner surface 17 of the casing on the outer diameter or outside surfaces 18 and 19 of the stator core 11 and the main frame 4 respectively which are approximately of equal diameter. This is accomplished by properly sizing the inner surface 17 of the casing such that its diameter is slightly smaller than the outside diameters of the stator core and the main frame. A differential in the dimensions of these members of from .005 to .010 inch has been found to work very satisfactorily in a casing deep drawn from cold rolled steel. In this manner, the stator 11 and the main frame assembly, which includes the compressor 3, the main frame 4, the shaft 7 and the rotor 10, are maintained in their proper position within the casing without the need of additional connecting members to maintain the proper disposition of these components.

In the manufacture of the above hermetic compressors it will be seen that the inner annular surface 16 of the stator core must be approximately concentric with its outer surface 18 and the bearing surface 6 must be approximately concentric with the outside surface 19 of the main frame. Some runout or out of concentricity between these surfaces of the respective parts due to manufacturing tolerances can be tolerated as the method of the present invention for assembling these members, to be hereinafter described, automatically compensates for slight errors in concentricity. The method of making the compressor of Fig. 1 briefly comprises providing a stator core having an accurately dimensioned inner and outer annular surface; arranging the main frame assembly, which comprises the main frame, compressor, and shaft, in coaxial relation with the stator core with the external surface of the shaft in coaxial relation with the inner annular surface of the stator core; and, while maintaining the inner annular surface of the stator and the shaft surface in coaxial relationship, shrinking the outer casing over the outer surfaces of the stator and main frame respectively.

Figure 2:
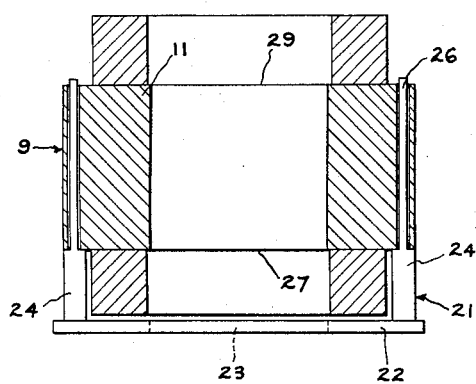
Fig. 2 is an elevational view of a stator arranged for assembly by the method of the present invention.

The specific method employed in assembling this compressor may be more fully described by referring to Figs. 2–6. In Fig. 2, there is shown a jig 21 for properly locating the stator 11 with respect to the other components of the compressor. The jig comprises a base 22 having a circular opening 23 therein and having a plurality of stator supporting legs 24 spaced uniformly around the outer portion of the base 22. In Fig. 2 only two supporting legs are shown for purposes of illustration, but it should be stated that there are at least three such legs spaced uniformly around the base for supporting the stator thereon. Protruding from the upwardly extending legs 24 are slender main frame locating rods 26. The stator 11 is positioned upon the jig 21 such that one end surface 27 of the stator core is positioned upon the upper surface of the legs 24 with the rods 26 extending upwardly through the mounting holes 28 provided in the stator. As may be seen in Fig. 2, when the stator is arranged upon the jig 21, the rods 26 protrude slightly above the end or upper surface 29 of the stator.

Figure 3:
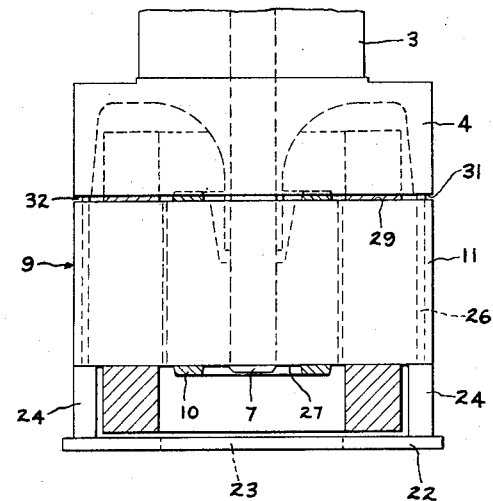
Fig. 3 is an elevation view illustrating the main frame with the shaft and the rotor positioned in approximate coaxial relation with the stator.

After arranging the stator, the main frame assembly, which has been pre-assembled from the main frame 4, the compressor 3, the shaft 7 and rotor 10 is positioned over the stator, as indicated in Fig. 3, such that the end or lower surface 31 of the main frame, as seen in Fig. 3, is adjacent the end 29 of the stator and is supported upon the ends of the locating rods 26. The rotor 10 is inserted into the inner annular surface 16 of the stator. As may be seen in Fig. 3, there is a slight gap 32 present between the adjacent ends 31 and 29 of the frame 4 and stator 11 respectively. The function of this gap will be explained in greater detail later in the specification.

Figure 4:
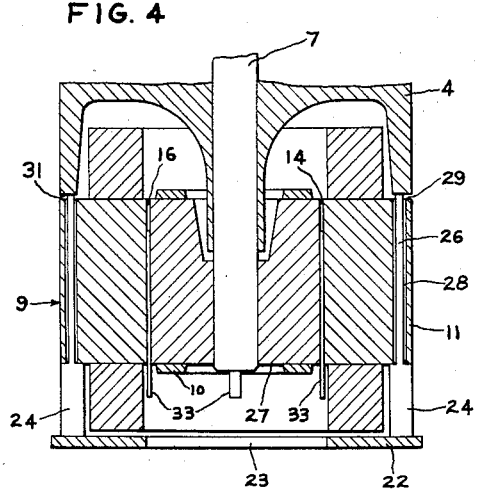
Fig. 4 is a partial elevation view, in cross section, showing gauge means between the rotor and stator for positioning the parts in proper relationship to each other.

As may best be seen in Fig. 4, in order to maintain the proper air gap between the inner annular surface 16 of the stator and the external surface 14 of the rotor and, thereby, the coaxial relationship between the external surface of the shaft and the inner annular surface of the stator, gauge means in the form of spring steel shims 33 are inserted through the opening 23 in the base 22 of the jig 21 and into the air gap 13 between the rotor 10 and the stator 11. At least three shims of the character shown must be used although if arcuate shims of greater width are employed it is possible to obtain satisfactory air gap concentricity with one or two shims. It has been found that shim stock having a minimum thickness slightly greater or equal to the minimum permissible air gap between the rotor external surface 14 and the inner stator surface 16 are sufficient to maintain the air gap during the assembly operation. As may be seen in Fig. 4, all the components of the compressor are now in their proper relationship for performing their operating functions.

Since the rotor 10 is machined to very close tolerances and provides an external surface which is concentric with the shaft, the rotor in combination with the shims form a gauge means for coaxially positioning the shaft 9 in relation to the annular inner surface 16 of the stator. Obviously, the rotor 10 and shims 33 can be eliminated by using a regular gauge or fixture in the form of the rotor or plug having an accurately dimensioned outer diameter of slightly greater dimensions than that of the rotor 10 and with an accurately dimensioned bore for locating on the surface of the shaft and for holding the shaft in fixed relation with the annular inner surface 16 of the stator. This could be made a permanent part of the jig 21 or could be inserted through the hole 23 in the jig 21. When such a gauge means is substituted for the rotor 9, then the rotor is assembled onto the shaft after the subassembly of the stator 9, main frame 4 and casing 2.

Figure 5:
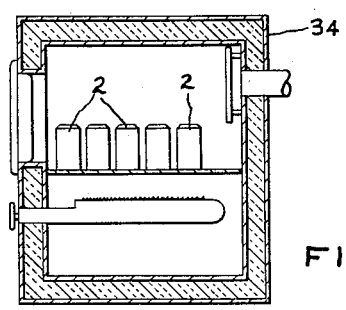
Fig. 5 is a schematic illustration showing a furnace and several hermetic casings therein.

The hermetic casing, which is to be shrunk around the outer peripheries of the stator and main frame to hold them in the above position, is placed into a suitable furnace 34, as illustrated in Fig. 5, in which the temperature of the casing 2 is raised to cause sufficient expansion of the casing to permit it to slide easily over the outer diameters of the frame and the stator. It was found, in using a casing which had been deep drawn from cold rolled steel to a minimum inner surface diameter of 5.472 inches, that a temperature of 600° F. was sufficient to expand the casing wherein it could easily be positioned over the stator-main frame assembly.

Figure 6:
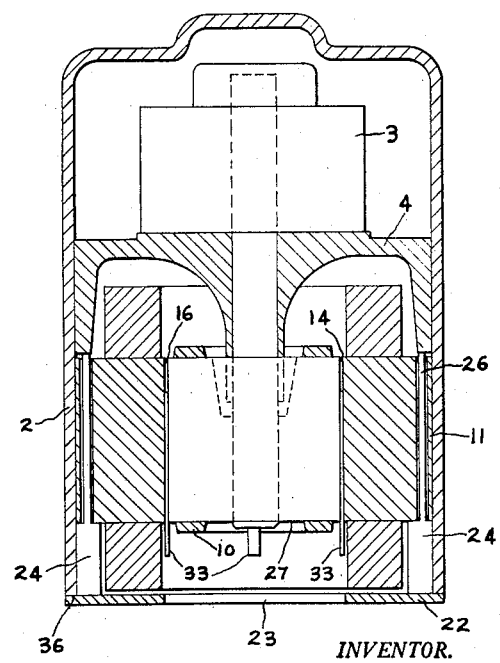
Fig. 6 is an elevation view in cross section, illustrating the main frame and motor assembly with the hermetic casing shrunk thereon prior to removal of the gauge means.

Now, looking at Fig. 6, this represents the last step in the method of assembling the main frame assembly and motor in which a properly sized hermetic casing 2, having an inside diameter slightly smaller than the outside diameters of the main frame 4 and the stator core 11 is shrunk fit over the outer surfaces of stator core 11 and the frame 4. This step is performed while at the same time maintaining the coaxial alignment between the stator annular inner surface 16 and the shaft 7 by the use of the gauge means or rotor 10 and shims 33. The casing 2 is subjected to a proper heat treatment, as described above whereby its temperature is raised to cause expansion of the casing to permit it to pass freely over the stator and frame. The casing 2 is then placed over the main frame and stator until its open edge 36 abuts the upper surface of the base 22. When the edge 36 abuts the upper surface of the base 22 all of the components of the compressor are located in their proper positions with respect to the case. The outer casing is then permitted to cool to the temperature of the main frame and the stator and this thereupon securely unites the outside diameter of the stator core 11 and the frame 4 to the inside diameter of the casing. The coaxial relationship of the inner annular surface of the stator and the external surface of the shaft is maintained during the cooling of the casing by the gauge means. After the casing 2, the stator core 11 and main frame assembly have all assumed a uniform temperature, at least that part of the gauge means which locates on the stator inner annular surface is removed and the assembly is complete.

It should be noted that it is possible to obtain a difference in the dimensions of the stator and main frame relatively to inner surface of the casing by cooling these two members to a temperature wherein their outer diameters have shrunk sufficient to permit placing of the casing thereover. It is the applicant's opinion that this operation would be within the true scope of the applicant's invention since the end effect is to connect the outer surfaces of the stator and main frame to the casing by the resultant compressive forces within the casing. By the present invention, these resultant compressive forces are uniformly exerted around the peripheral surfaces of these two members and could be obtained by either the method of expanding the casing to pass freely over the stator core and main frame or the method of cooling the stator and main frame to shrink their outer diameters sufficiently to permit the casing to pass freely thereover.

Since the stator core is formed of a plurality of thin punchings held together by beads of weld around their outer periphery, there is a tendency for the punchings to flare slightly toward the inner portions of the stator core a short distance from the welds. In other words the end surface 29 of the stator core is not square with the inner annular surface 16. By providing the slight gap 32 between the ends 29 and 31 of the stator and the main frame respectively, rather than permitting them to touch, the necessity of machining the surface 29 of the stator core 11 to make it square is eliminated. Without the gap 32, when the flare of the stator core is not eliminated, it is very difficult to prevent slight canting of the main frame assembly upon placing it into position above the stator. It is also very difficult to obtain close vertical location of the rotor with respect to the stator when this is the case since the amount of flare present varies tremendously from stator to stator.

Another function of the gap 32 is to provide a short length of casing between the stator and the main frame. This permits the casing to become displaced a small amount during the shrinking thereof to compensate for slight errors in coaxial alignment between the outer surfaces 18 and 19 of the stator and the main frame after the inner surface 16 of the stator and the external surface 14 of the rotor have been aligned by the gauge means. More specifically, if the inner surface 16 and the outer surface 18 of the stator core 11 were not concentric, and assuming that the outer surface 19 of the main frame 4 and the external surface of the rotor were concentric, then, upon placing of the shims 32 into the air gap between the rotor and stator, the outer surfaces 18 and 19 of the stator core 11 and main frame 4 will not be in exact coaxial alignment. Thus, when the casing 2 shrinks onto these surfaces it will become displaced slightly in one direction or another and upon cooling and upon subsequent removal of the shims 32 it will maintain this displacement, thereby maintaining the proper concentricity of air gap between the external surface of the shaft and stator inner annular surface 16.

However, this gap must not be made too great. It has been found that a gap of 1/16 of an inch is sufficient to overcome any disadvantage arising from out of squareness and out of concentricity in the stator. When the gap becomes much greater there is a tendency for the casing to yield rather than become displaced during the shrinking thereof and when the shims 32 are removed it returns to its original position destroying the air gap concentricity.

By the present invention there has been provided a method of assembling a compressor main frame and motor whereby these two parts are not fixedly connected prior to placing them in the hermetic casing, yet satisfactory concentricity of air gap between the stator and rotor of the motor is effectively maintained. In addition to eliminating the step of fixedly connecting the two members together prior to their assembly within the hermetic casing, the present invention eliminates the need for annealing and other operations which are sometimes necessary to alleviate stresses produced in the motor stator from other types of connecting operations.

What I claim as new and desire to secure by Letters Patent of the United States is:

1. The method of assembling a compressor which comprises providing a substantially annular stator having an accurately dimensioned annular inner surface, providing a frame having an outer diameter approximately equal to the outer diameter of said stator and having a journal bearing with a drive shaft extending therethrough, said shaft having a motor rotor mounted upon one end thereof, positioning said stator and said frame with an external surface of said stator in approximately coaxial relation to the external surface of said frame about said drive shaft axis and with said rotor on said shaft arranged within said annular inner surface of said stator, said external surface and said inner surface of said stator being substantially concentric with said drive shaft axis and said external surface of said frame being substantially concentric with said journal bearing arranging and maintaining said stator inner annular surface in coaxial relation with the external surface of said rotor by gauge means disposed in the air gap between said rotor and said stator inner annular surface, providing an outer casing with an inner diameter slightly less than the outer diameters of said stator and said frame under the same temperature conditions, effecting through the agency of temperature change a difference in said outside diameter of said frame and said stator relatively to said inner diameter of said casing, positioning said casing over said frame and said stator, restoring said casing frame and said stator to a uniform temperature while maintaining with said gauge means said coaxial relation between said rotor external surface and said stator inner annular surface thereby securely uniting said outer diameter of said stator and said frame to said casing, and removing said gauge means.

2. The method of assembling a compressor which comprises providing a substantially annular stator having an accurately dimensioned annular inner surface, providing a frame having an outer diameter approximately equal to the outer diameter of said stator and having a journal bearing with a drive shaft extending therethrough, said shaft being in driving relation with a compressor mounted on one side of said frame, said shaft having a motor rotor mounted upon the other end thereof, positioning said stator and said frame with an external surface of said stator in approximately coaxial relation to the external surface of said frame about said drive shaft axis and with said rotor on said shaft arranged within said annular surface of said stator, said external surface and said inner surface of said stator being substantially concentric with said drive shaft axis and said external surface of said frame being substantially concentric with said journal bearing, said adjacent ends of said frame and said stator having a slight gap therebetween, arranging and maintaining said stator inner annular surface in coaxial relation to the external surface of said rotor by gauge means disposed in the air gap between said rotor and said stator inner annular surface, providing an outer casing with an inner diameter slightly less than the outer diameter of said stator and said frame respectively under the same temperature conditions, heating said casing to expand said inner surface diameter to a dimension greater than said outer diameters of said frame and said stator respectively, positioning said casing over said frame and said stator, permitting said casing to shrink around said outer diameters of said frame and said stator while maintaining with said gauge means said coaxial relation between said rotor external surface and said stator inner annular surface and while maintaining said slight gap between said adjacent ends of said stator and said frame thereby securely uniting said outer diameters of said stator and said frame to said casing, and removing said gauge means.

3. The method of assembling a compressor which comprises providing a substantially annular stator having an accurately dimensioned annular inner surface, providing a frame having an outer diameter approximately equal to the outer diameter of said stator and having a journal bearing with a drive shaft extending therethrough, said shaft being in driving relation with a compressor mounted on one side of said frame, said shaft having a motor rotor mounted upon the other end thereof, positioning said stator and said frame with the external surface of said stator in approximately coaxial relation to the external surface of said frame about said drive shaft axis and with said rotor on said shaft arranged within said annular inner surface of said stator, said external surface and said inner surface of said stator being substantially concentric with said drive shaft axis and said external surface of said frame being substantially concentric with said journal bearing arranging and maintaining said stator inner annular surface in coaxial relation to the external surface of said rotor by inserting accurately dimensioned shims in the air gap between said rotor and said stator inner annular surface, said shims having a thickness slightly greater than the minimum permissible air gap between said rotor and said stator, providing an outer casing with an inner diameter slightly less than the outer diameters of the stator and said frame respectively under the same temperature conditions, heating said casing to expand said inner diameter thereof to a dimension greater than said outer diameters of said frame and said stator respectively, positioning said casing over said frame and said stator, restoring the temperature of said casing to that of said frame and said stator while maintaining with said shims said coaxial relation between said rotor external surface and said stator inner annular surface thereby securely uniting said outer diameters of said stator and said frame to said casing, and removing said shims from said air gap between said rotor and said stator.

References Cited in the file of this patent

UNITED STATES PATENTS

| | | |
|---|---|---|
| 2,054,118 | Childs et al. | Sept. 15, 1936 |
| 2,411,684 | Hamilton et al. | Nov. 26, 1946 |
| 2,677,065 | Van der Heem | Apr. 27, 1954 |